D. Lesh. Jr.
Weighing Faucet.
No. 101,633.  Patented Apr. 5, 1870.
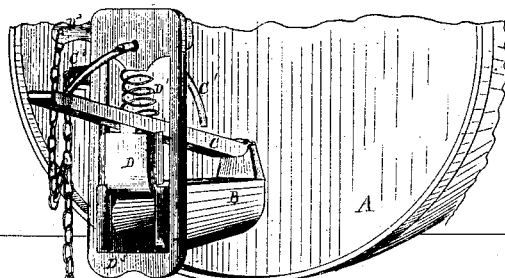
Fig. 1
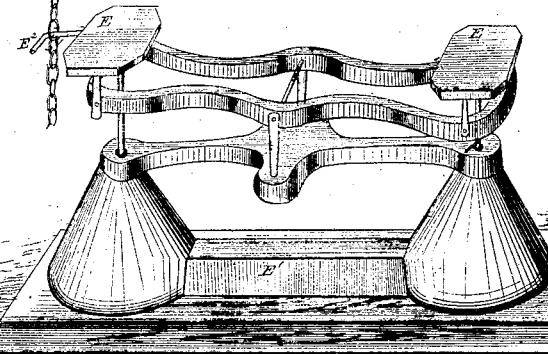
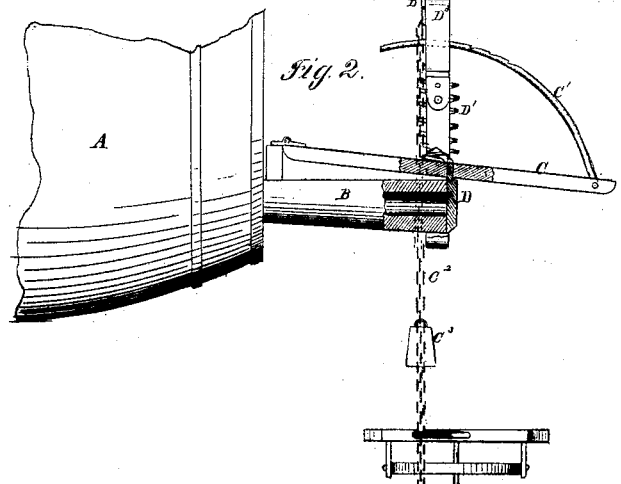
Fig. 2.   Fig. 3
Witnesses:
D. Lesh, Jr.
Inventor
D.P. Holloway & Co.
Attys

United States Patent Office.

DANIEL LESH, JR., OF LIVERPOOL, PENNSYLVANIA.

Letters Patent No. 101,633, dated April 5, 1870.

IMPROVEMENT IN WEIGHING-FAUCETS.

The Schedule referred to in these Letters Patent and making part of the same.

*To all whom it may concern:*

Be it known that I, DANIEL LESH, Jr., of Liverpool, in the county of Perry and State of Pennsylvania, have invented certain Improvements in Automatic Faucets; and I do hereby declare that the following is a full, clear, and exact description thereof, reference being had to the annexed drawings making part of this specification, in which—

Figure 1 is a perspective view of my improved apparatus, showing the faucet as applied to a cask, the weight for closing the valve, its connection with the scale-beam, and the scales for weighing the material drawn from the cask.

Figure 2 is an end view of the device with its valve closed, also showing its connection with the cask.

Figure 3 is an elevation of the detaching-mechanism, showing the position of the weight when in position to be acted upon by the scale-beam for the purpose of closing the valve.

Corresponding letters refer to corresponding parts in all the figures.

This invention relates to that class of faucets which determine the quantity of liquid to be drawn at any one time by weighing the same, and which automatically stop the flow from the cask when the required or determined quantity has been drawn; and It consists in providing a graduated sector by which the amount of opening given to the valve may be regulated to control the flow of liquids or semi-liquids of different specific gravity; and further, in providing a weight for closing such valve when the determined quantity has been drawn into the vessel arranged for its reception; and further, in the combination and arrangement of the parts of which it is composed, as will be more fully described hereinafter.

To enable those skilled in the art to make and use my invention, I will proceed to describe its construction and operation.

A in the drawings refers to a cask, which may be used to hold any kind of liquid.

B refers to a faucet, which may be of wood or of metal, its inner end being rounded so as to enter a hole formed in the cask, while, at its outer end, it is provided with flanges to receive and hold in place the valve D. Near the inner end of this faucet a projection is raised upon its upper surface, to which the end of lever C is hinged, as shown in figs. 1 and 2.

C refers to the lever above alluded to, it being hinged to the projection upon the faucet at its inner end, from which point it extends outward beyond the end of the faucet for a distance sufficient to enable it to receive the end of the graduated sector $C^1$.

At a point corresponding with the valve-seat upon the end of the faucet, this lever is slotted to receive the end of the valve D, which is pivoted thereto in such a manner that, as the lever rises and falls, the valve will be carried with it, and thus be opened and closed.

$C^1$ refers to a graduated sector, which is attached to the outer end of lever C so as to move with it, its upper end passing through the yoke $D^3$.

The upper or outer surface of this sector is to be provided with a series of notches, so that, as the valve is opened, by raising the outer end of the lever C, the dog or arm $D^2$ shall come in contact therewith, and thus hold the valve in any desired position, so that when it is desirable to draw different kinds of molasses, for instance, the area of the opening may be increased for the thicker kinds and diminished for the thinner kinds, and so with reference to any liquids of any other kind.

$C^2$ refers to a chain or cord, which is attached to the outer end of arm $D^2$, soon to be described.

$C^3$ refers to a weight which is attached to the chain or cord C at a point between the end of arm $D^2$ and the point where it is attached to the scale-beam, the object being to so arrange it that it may be placed upon a bracket attached to the yoke $D^3$, so that, as the end of the scale-beam upon which the vessel for receiving the liquid to be weighed is placed, the weight shall be quickly drawn from its supporting bracket, and in falling shall release the arm from the control of the notches in the sector, and thus permit the spring $D^1$ to instantaneously close the valve. The particular shape given to this weight, and the position in which it is placed upon its bracket or support, greatly facilitates the operation above described.

$C^3$ refers to the weight, its form and position being shown in figs. 1 and 3.

D refers to a valve which is of the ordinary slide-kind, it being beveled upon its outer edges so as to slide within the flanges formed upon the edge of the faucet, as shown in fig. 1.

$D^1$ refers to a spring, which is placed between the lever C and the upper end of the yoke $D^3$, its office being to close the valve so soon as the sector $C^1$ has been released from the control of the arm $D^2$, which, as will be seen by referring to fig. 3, is pivoted to the upper end of the yoke $D^3$, its outer end receiving the chain $C^2$, while its inner end works in a guide, also secured to the yoke. The arrangement of this lever is such that when in the position shown in the figure alluded to, it will hold the graduated sector in a position to give any required area of opening to the valve, but upon the falling of the weight to the position shown in fig. 2, the inner end thereof will be raised, which will allow the spring to close the valve, as above stated.

$D^3$ refers to the yoke which is attached to the outer end of the faucet B, its office being to carry the parts described as being attached thereto.

E E refer to the platform of a balanced beam, which may be in the form of weighing-scales, and may be of any known form of construction which is adapted to receive the vessel into which the liquid is to be drawn, upon one end of the beam, while the other is adapted to receive the weights which are to determine the quantity to be drawn into such vessel.

$E^1$ refers to a platform upon which the scales may be mounted, which may have rollers or wheels in its lower surface for convenience in moving.

$E^2$ refers to a pin or hook, which projects from the platform or end of the beam upon which the receiving-vessel is placed, so that, as such end is carried down and the chain which is attached to such pin is moved, it shall cause the weight to be drawn from its bracket and permitted to fall, so as to permit the spring to close the valve.

The relation which this weighing-mechanism sustains to the other parts of the device is clearly shown in fig. 1, upon reference to which the operation will be apparent without further description.

Having thus described my invention,

What I claim, and desire to secure by Letters Patent, is—

1. An automatic weighing or measuring device, having a graduated sector, by which the area of the aperture through which the material to be measured flows may be controlled, substantially as and for the purpose set forth.

2. An automatic weighing or measuring device, having a weight, $C^3$, arranged to fall, and thus release the graduated sector and permit the spring to close the discharge-aperture, substantially as and for the purpose set forth.

3. The combination and arrangement of the platform E, hook or pin $E^2$, chain or cord $C^2$, weight $C^3$, arm $D^2$, and sector $C^1$, substantially as and for the purpose specified.

4. The combination and arrangement of the faucet B, valve D, lever C, graduated sector $C^1$, spring $D^1$, and yoke $D^3$, substantially as and for the purpose specified.

In testimony whereof I have signed my name to this specification in the presence of two subscribing witnesses.

DANIEL LESH, Jr.

Witnesses:
B. Edw. J. Eils,
A. Ruppert.